(12) United States Patent
Tsai et al.

(10) Patent No.: US 11,770,696 B2
(45) Date of Patent: Sep. 26, 2023

(54) UE CAPABILITY SIGNALING FOR SUPPORTING REFERENCE SIGNAL BASED MEASUREMENTS IN 5G NEW RADIO UNLICENSED SPECTRUM (NR-U)

(71) Applicant: MEDIATEK INC., Hsin-Chu (TW)

(72) Inventors: Chiou-Wei Tsai, Hsin-Chu (TW); Cheng-Rung Tsai, Hsin-Chu (TW)

(73) Assignee: MediaTek INC., Hsin-Chu (TW)

( * ) Notice: Subject to any disclaimer, the term of this patent is extended or adjusted under 35 U.S.C. 154(b) by 76 days.

(21) Appl. No.: 17/190,771

(22) Filed: Mar. 3, 2021

(65) Prior Publication Data

US 2021/0306843 A1   Sep. 30, 2021

Related U.S. Application Data

(60) Provisional application No. 63/014,813, filed on Apr. 24, 2020, provisional application No. 63/000,539, filed on Mar. 27, 2020.

(51) Int. Cl.
*H04W 8/24* (2009.01)
*H04B 7/06* (2006.01)
*H04W 16/14* (2009.01)
*H04W 24/10* (2009.01)
*H04L 5/00* (2006.01)

(52) U.S. Cl.
CPC ............ *H04W 8/24* (2013.01); *H04B 7/0626* (2013.01); *H04B 7/0695* (2013.01); *H04L 5/0051* (2013.01); *H04W 16/14* (2013.01); *H04W 24/10* (2013.01)

(58) Field of Classification Search
CPC ....... H04W 8/24; H04W 16/14; H04W 24/10; H04B 7/0626; H04B 7/0695; H04L 5/0051
See application file for complete search history.

(56) References Cited

U.S. PATENT DOCUMENTS

| | | | |
|---|---|---|---|
| 10,292,053 B2 * | 5/2019 | Youtz | H04W 16/14 |
| 10,897,772 B2 * | 1/2021 | Ingale | H04W 72/1215 |
| 2016/0227428 A1 * | 8/2016 | Novlan | H04L 5/0053 |
| 2016/0337102 A1 * | 11/2016 | Xin | H04W 76/27 |

(Continued)

FOREIGN PATENT DOCUMENTS

| | | | | |
|---|---|---|---|---|
| CN | 101835191 A | 4/2010 | | |
| WO | WO-2020167554 A1 * | 8/2020 | ............ | H04L 5/001 |
| WO | WO-2021064888 A1 * | 4/2021 | | |

OTHER PUBLICATIONS

Taiwan IP Office, office action for application 110109965, dated Sep. 30, 2021 (no English translation is available), 6 pages.

*Primary Examiner* — Deepa Belur
(74) *Attorney, Agent, or Firm* — IMPERIUM PATENT WORKS; Zheng Jin

(57) ABSTRACT

A method for UE capability signaling for supporting reference signal based measurements in NR-U is proposed. A UE transfers its UE capability information to a mobile communication network, wherein the UE capability information includes information regarding whether the UE supports measurements of a CSI-RS on an unlicensed cell. The UE receives configuration from the mobile communication network, wherein the configuration includes information regarding radio resources of the CSI-RS on the unlicensed cell. The UE measures the CSI-RS on the unlicensed cell based on the configuration.

20 Claims, 4 Drawing Sheets

(56) References Cited

U.S. PATENT DOCUMENTS

| | | | |
|---|---|---|---|
| 2017/0195099 A1* | 7/2017 | Kahtava | H04W 72/20 |
| 2019/0116489 A1* | 4/2019 | Harada | H04W 72/0453 |
| 2019/0158155 A1* | 5/2019 | Park | H04L 5/001 |
| 2019/0312704 A1 | 10/2019 | Rico Alvarino et al. | H04L 5/00 |
| 2021/0050976 A1* | 2/2021 | Noh | G06F 9/4887 |
| 2021/0144703 A1* | 5/2021 | Jung | H04W 72/0413 |
| 2021/0235492 A1* | 7/2021 | Iyer | H04L 5/001 |
| 2021/0297884 A1* | 9/2021 | Harada | H04W 24/10 |
| 2021/0392668 A1* | 12/2021 | Yoon | H04W 72/0446 |
| 2022/0150766 A1* | 5/2022 | Zhao | H04W 36/0044 |
| 2022/0166576 A1* | 5/2022 | Harada | H04L 5/001 |

\* cited by examiner

UE CAPABILITY SIGNALING FOR SUPPORTING REFERENCE SIGNAL BASED MEASUREMENTS IN 5G NEW RADIO UNLICENSED SPECTRUM (NR-U)

CROSS REFERENCE TO RELATED APPLICATIONS

This application claims priority under 35 U.S.C. § 119 from U.S. Provisional Application No. 63/000,539, entitled "Methods for UE capability signaling", filed on Mar. 27, 2020; U.S. Provisional Application No. 63/014,813, entitled "Methods for capability signaling", filed on Apr. 24, 2020, the subject matter of which is incorporated herein by reference.

TECHNICAL FIELD

The disclosed embodiments relate generally to wireless communication, and, more particularly, to methods for UE capability signaling for supporting reference signal based measurements in 5G New Radio (NR) unlicensed spectrum (NR-U).

BACKGROUND

The wireless communications network has grown exponentially over the years. A Long-Term Evolution (LTE) system offers high peak data rates, low latency, improved system capacity, and low operating cost resulting from simplified network architecture. LTE systems, also known as the 4G system, also provide seamless integration to older wireless network, such as GSM, CDMA and Universal Mobile Telecommunication System (UMTS). In LTE systems, an Evolved Universal Terrestrial Radio Access Network (E-UTRAN) includes a plurality of evolved Node-Bs (eNodeBs or eNBs) communicating with a plurality of mobile stations, referred to as User Equipments (UEs). The $3^{rd}$ Generation Partner Project (3GPP) network normally includes a hybrid of 2G/3G/4G systems. With the optimization of the network design, many improvements have developed over the evolution of various standards. The Next Generation Mobile Network (NGMN) board, has decided to focus the future NGMN activities on defining the end-to-end requirements for 5G New Radio (NR) systems.

In 3GPP release 16 specifications, support for 5G NR operating in unlicensed spectrum is introduced (such feature is also called NR-U) to bring to 5G a variety of options for flexibly utilizing the unlicensed spectrum. NR-U supports both license-assisted and standalone use of unlicensed spectrum. Specifically, standalone NR-U enables 5G to be deployed via small cell deployments and operated by any vertical end user without requiring licensed spectrum. This new feature will allow 5G NR to leverage the 5 GHz global band as well as the 6 Hz band, significantly increasing the spectrum reach of 5G.

With unlicensed operation, transmissions, including reference signal transmissions, are subject to Listen-Before-Talk (LBT) which is a mechanism that requires the transmitting entity to sense the availability of an unlicensed channel before performing any transmission. The LBT requirement creates uncertainty for the channel availability, which is fundamentally different from the licensed-based access, where all the transmissions occur at prescheduled and fixed times. Moreover, with unlicensed operation, reference signals for measurement purpose can be transmitted alone without other channels data and signals. As a result, a User Equipment (UE) needs to first determine whether a reference signal has been successfully transmitted by a 5G network before the UE can use the reference signal for measurement, and this will inevitably increase UE's complexity regarding radio signal processing.

A solution is sought.

SUMMARY

In the invention, it is proposed that measurements, especially those based on reference signals, on an unlicensed cell should be optional UE capability.

Also, a method for UE capability signaling for supporting reference signal based measurements in NR-U is proposed. A UE transfers its UE capability information to a mobile communication network, wherein the UE capability information comprises information regarding whether the UE supports measurements of a CSI-RS on an unlicensed cell. The UE receives configuration from the mobile communication network, wherein the configuration comprises information regarding radio resources of the CSI-RS on the unlicensed cell. The UE measures the CSI-RS on the unlicensed cell based on the configuration.

In one embodiment, the UE capability information indicates whether the UE supports measurements of the CSI-RS on the unlicensed cell for Beam Failure Detection (BFD) or Candidate Beam Detection (CBD), and the measuring of the CSI-RS on the unlicensed cell is performed for BFD or CBD.

In another embodiment, the UE capability information indicates whether the UE supports measurements of the CSI-RS on the unlicensed cell for Radio Link Monitoring (RLM), and the measuring of the CSI-RS on the unlicensed cell is performed for RLM.

In another embodiment, the UE capability information indicates whether the UE supports measurements of the CSI-RS on the unlicensed cell for Radio Resource Management (RRM), and the measuring of the CSI-RS on the unlicensed cell is performed for RRM.

In one example, the UE capability information indicates whether the UE supports measurements of the CSI-RS on the unlicensed cell with an indication from the mobile communication network. The indication may comprise at least one of the following: a Synchronization Signal Block (SSB); Physical Downlink Control Channel (PDCCH) data; Group-Common PDCCH (GC-PDCCH) data; and Physical Downlink Shared Channel (PDSCH) data. The SSB may comprise a Primary Synchronization Signal (PSS), Secondary Synchronization Signal, and a Physical Broadcast Channel (PBCH). The SSB may also be represented by SS/PBCH block.

In another embodiment, the UE capability information indicates that the UE supports measurements of the CSI-RS on the unlicensed cell as long as the CRS-RS is transmitted within a time duration by the unlicensed cell. The time duration may be a Channel Occupancy Time (COT) in PDCCH, which is acquired by the unlicensed cell. The UE may cancel CSI-RS reception in a set of symbols of a slot, which are not within the COT.

In one example, the UE capability information is set and reported per frequency band.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
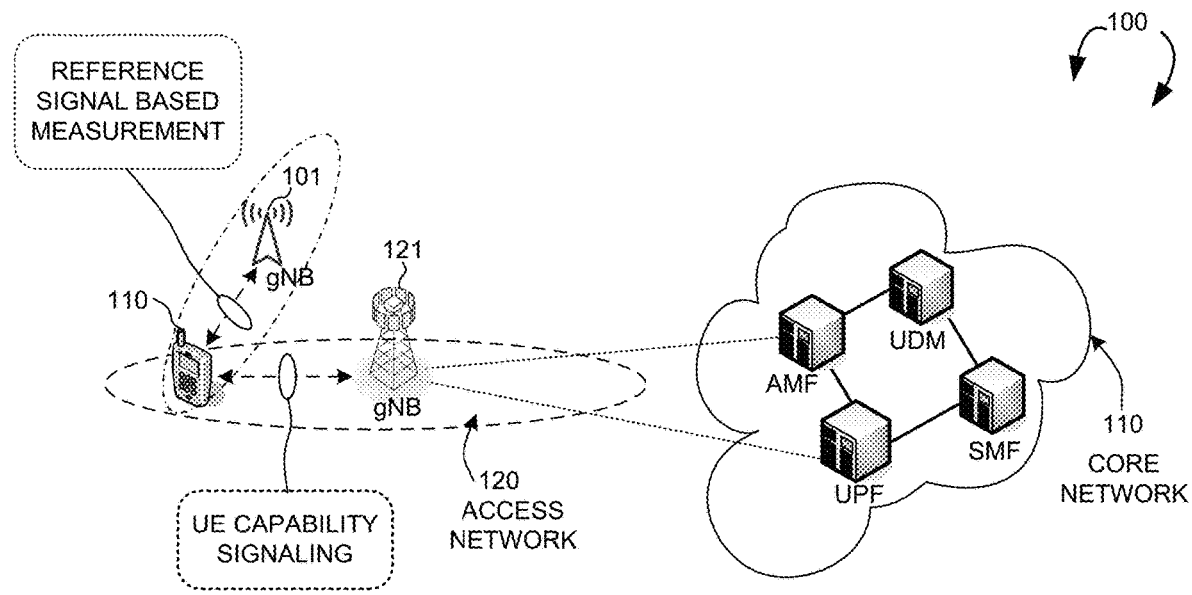
FIG. 1 illustrates an exemplary 5G new radio (NR) network 100 supporting unlicensed spectrum in accordance with one novel aspect.

FIG. 1 illustrates an exemplary 5G new radio (NR) network 100 supporting unlicensed spectrum in accordance with one novel aspect. 5G NR network 100 comprises a user equipment (UE) 110 communicatively connected to a gNB 121 operating in a licensed band (e.g., 30 GHz~300 GHz for mmWave) of an access network 120. The access network 120 is connected to a 5G core network 130 by means of the NG interface, more specifically to a User Plane Function (UPF) by means of the NG user-plane part (NG-u), and to a Mobility Management Function (AMF) by means of the NG control-plane part (NG-c). One gNB can be connected to multiple UPFs/AMFs for the purpose of load sharing and redundancy.

In addition to the gNB 121, the UE 110 is surrounded by one or more gNBs, including the gNB 101, which operate in an unlicensed band (e.g., 5 GHz or 6 GHz). The gNB 101 may be deployed by the same operator of the gNB 121, or may be deployed by a different operator than the operator of the gNB 121. The gNB 121 may form at least one cell which may be referred to as an NR-based licensed cell (i.e., a cell operating in a 5G NR licensed band). Similarly, the gNB 101 may form at least one cell which may be referred to as an NR-based unlicensed cell (i.e., a cell operating in an unlicensed band).

The UE 110 may be a smart phone, a wearable device, an Internet of Things (IoT) device, and a tablet, etc., and may or may not support measurements of reference signals (e.g., Channel State Information-Reference Signal (CSI-RS) and/or SSB) on an unlicensed cell.

In accordance with one novel aspect, if the UE 110 supports measurements of reference signals (e.g., CSI-RS and/or SSB) on an unlicensed cell and camps on the cell (e.g., a PCell or PSCell) formed by the gNB 121, the UE 110 may transfer its UE capability information regarding whether it supports measurements of reference signals on an unlicensed cell to the serving cell during a UE capability transfer procedure. After that, the gNB 121 may configure the UE 110 with radio resources of the reference signals on the unlicensed cell, and the UE 110 may measure the reference signals on the unlicensed cell based on the configuration of the radio resources of the reference signals.

In one embodiment, the UE capability information may indicate whether the UE supports measurements of a CSI-RS or SSB on the unlicensed cell for Beam Failure Detection (BFD) or Candidate Beam Detection (CBD). That is, the measurement of the CSI-RS/SSB on the unlicensed cell is performed for BFD or CBD. For example, the UE capability information may include a "csi-RS-BFD-CBD-r16" Information Element (IE) for indicating the UE's support of CSI-RS based measurements for BFD/CBD.

In another embodiment, the UE capability information may indicate whether the UE supports measurements of a CSI-RS on the unlicensed cell for Radio Link Monitoring (RLM). That is, the measurement of the CSI-RS on the unlicensed cell is performed for RLM, e.g., for detecting radio link failures. For example, the UE capability information may include a "csi-RS-RLM-r16" IE for indicating the UE's support of CSI-RS based measurements for RLM.

In another embodiment, the UE capability information may indicate whether the UE supports measurements of a CSI-RS on the unlicensed cell for Radio Resource Management (RRM). That is, the measurement of the CSI-RS on the unlicensed cell is performed for RRM, and the UE may report the measurement results to the gNB. For example, the UE capability information may include a "csi-RS-RRM-r16" IE for indicating the UE's support of CSI-RS based measurements for RRM.

In another embodiment, the UE capability information may indicate whether the UE supports measurements of a CSI-RS on the unlicensed cell in the presence of a network indication. That is, the measurement of the CSI-RS on the unlicensed cell is performed only when the UE detects the presence of the network indication. The network indication may include at least one of an SSB, a Physical Broadcast Channel (PBCH) block, Physical Downlink Control Channel (PDCCH) data, Group-Common PDCCH (GC-PDCCH) data, and Physical Downlink Shared Channel (PDSCH) data. For example, the UE capability information may include a "periodicAndSemi-PersistentCSI-RS-r16" IE for indicating the UE's support of CSI-RS based measurements with a network indication.

In another embodiment, the UE capability information may indicate whether the UE supports measurements of a CSI-RS on the unlicensed cell with the CSI-RS being transmitted within a time duration. That is, the measurement of the CSI-RS on the unlicensed cell may be performed only when the CSI-RS is transmitted within the time duration. Otherwise, the UE may cancel measuring the CSI-RS that is not transmitted within the time duration, i.e., the UE may cancel CSI-RS reception in a set of symbols that are not within the time duration. For example, the time duration may be a Channel Occupancy Time (COT) in PDCCH, which is acquired by the unlicensed cell and provided to the UE in a "CO-DurationPerCell-r16" IE.

Figure 2:
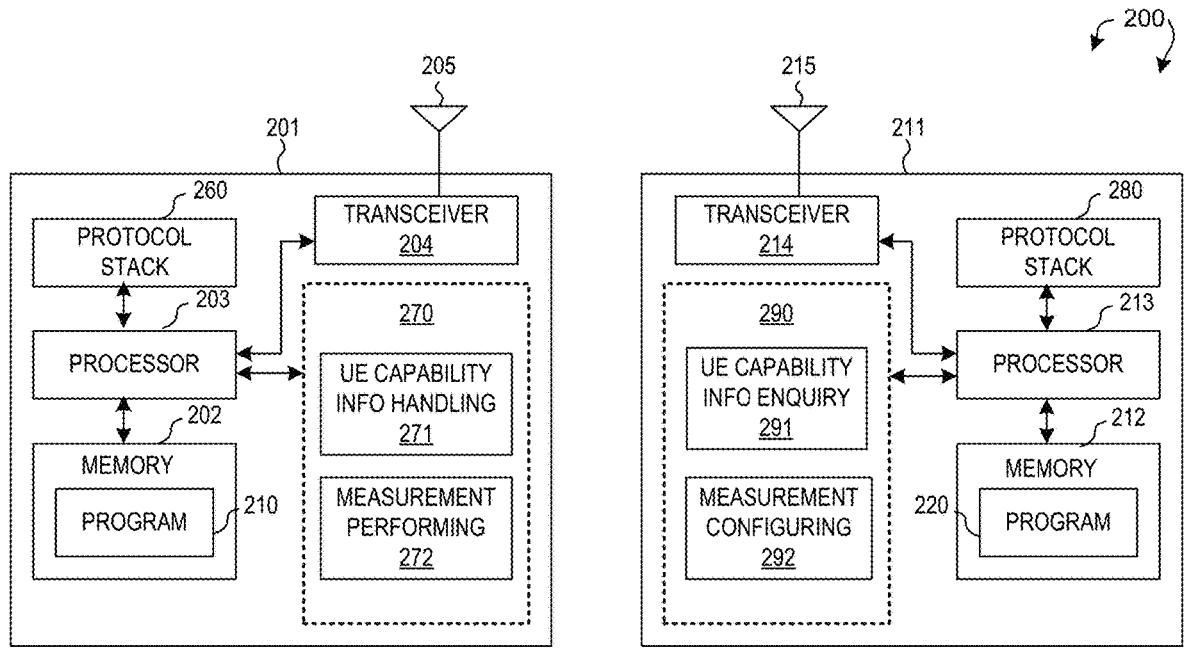
FIG. 2 illustrates simplified block diagrams of wireless devices in accordance with embodiments of the current invention.

FIG. 2 illustrates simplified block diagrams of wireless devices, e.g., a UE 201 and a gNB 211 in accordance with embodiments of the current invention. The gNB 211 has an antenna 215, which transmits and receives radio signals. A radio frequency RF transceiver module 214, coupled with the antenna 215, receives RF signals from the antenna 215, converts them to baseband signals and sends them to the processor 213. The RF transceiver 214 also converts received baseband signals from the processor 213, converts them to RF signals, and sends out to the antenna 215. The processor 213 processes the received baseband signals and invokes different functional modules to perform features in the gNB 211. The memory 212 stores program instructions and data 220 to control the operations of the gNB 211. In the example of FIG. 2, the gNB 211 also includes a protocol stack 280 and a set of control function modules and circuits 290. The protocol stack 280 may include a Non-Access-Stratum (NAS) layer to communicate with an AMF/SMF/MME entity connecting to the core network, a Radio Resource Control (RRC) layer for high layer configuration and control, a Packet Data Convergence Protocol/Radio Link Control (PDCP/RLC) layer, a Media Access Control (MAC) layer, and a Physical (PHY) layer. In one example, the control function modules and circuits 290 include a UE capability information enquiry circuit 291 that enquires the UE capability information of the UE 201, and a measurement configuring circuit 292 that prepares the configuration of radio resources of the CSI-RS/SSB on the unlicensed cell.

Similarly, the UE 201 has a memory 202, a processor 203, and a radio frequency (RF) transceiver module 204. The RF transceiver 204 is coupled with the antenna 205, receives RF signals from the antenna 205, converts them to baseband signals, and sends them to the processor 203. The RF transceiver 204 also converts received baseband signals from the processor 203, converts them to RF signals, and sends out to the antenna 205. The processor 203 processes the received baseband signals and invokes different functional modules and circuits to perform features in the UE 201. The memory 202 stores data and program instructions 210 to be executed by the processor 203 to control the operations of the UE 201. Suitable processors include, by way of example, a special purpose processor, a digital signal processor (DSP), a plurality of micro-processors, one or more micro-processor associated with a DSP core, a controller, a microcontroller, application specific integrated circuits (ASICs), file programmable gate array (FPGA) circuits, and other type of integrated circuits (ICs), and/or state machines. A processor in associated with software may be used to implement and configure features of the UE 201.

The UE 201 also includes a protocol stack 260 and a set of control function modules and circuits 270. The protocol stack 260 may include a NAS layer to communicate with an AMF/SMF/MME entity connecting to the core network, an RRC layer for high layer configuration and control, a PDCP/RLC layer, a MAC layer, and a PHY layer. The Control function modules and circuits 270 may be implemented and configured by software, firmware, hardware, and/or combination thereof. The control function modules and circuits 270, when executed by the processor 203 via program instructions contained in the memory 202, interwork with each other to allow the UE 201 to perform embodiments and functional tasks and features in the network.

In one example, the control function modules and circuits 270 include a UE capability information handling circuit 271 that provides the information of the UE capability regarding whether the UE 201 supports measurements of reference signals (e.g., CSI-RS, and/or SSB) on an unlicensed cell, and a measurement performing circuit 272 that performs measurements of reference signals on an unlicensed cells.

Figure 3:
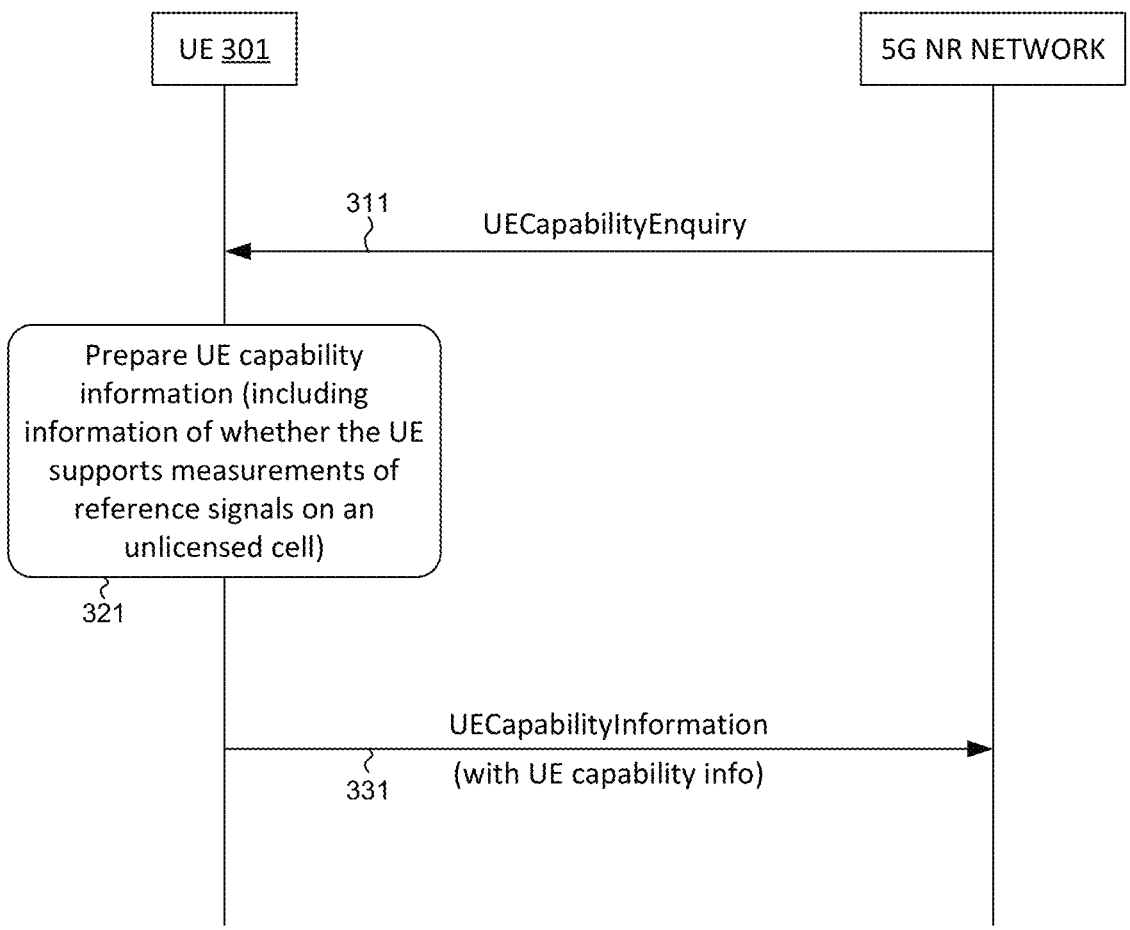
FIG. 3 illustrates a sequence flow between a UE 301 and a 5G NR network for UE capability signaling to support reference signal based measurements in NR-U in accordance with one novel aspect.

FIG. 3 illustrates a sequence flow between a UE 301 and a 5G NR network for UE capability signaling to support reference signal based measurements in NR-U in accordance with one novel aspect. In step 311, the UE 301 receives a UECapabilityEnquiry message from the 5G NR network. The 5G NR network may initiate this procedure to a UE in RRC_CONNECTED when it needs (additional) UE radio access capability information. The 5G NR network should retrieve UE capabilities only after AS security activation.

In step 321, the UE 301 prepares the UE capability information including the information of whether the UE 301 supports system information acquisition on an unlicensed cell. Specifically, the UE capability information may include a first indicator (e.g., a "csi-RS-BFD-CBD-r16" IE) of whether the UE 301 supports measurements of CSI-RS on an unlicensed cell for BFD/CBD, a second indicator (e.g., a "csi-RS-RLM-r16" IE) of whether the UE 301 supports measurements of CSI-RS on an unlicensed cell for RLM, a third indicator (e.g., a "csi-RS-RRM-r16" IE) of whether the UE 301 supports measurements of CSI-RS on an unlicensed cell for RRM, and/or a fourth indicator(e.g., a "periodicAnd-Semi-PersistentCSI-RS-r16" IE) of whether the UE 301 supports measurements of CSI-RS on an unlicensed cell with a network indication (e.g., PDCCH/GC-PDCCH/PDSCH data, or SSB). In step 331, the UE 301 sends a UECapabilityInformation message including the UE capability information to the 5G NR network.

Figure 4:
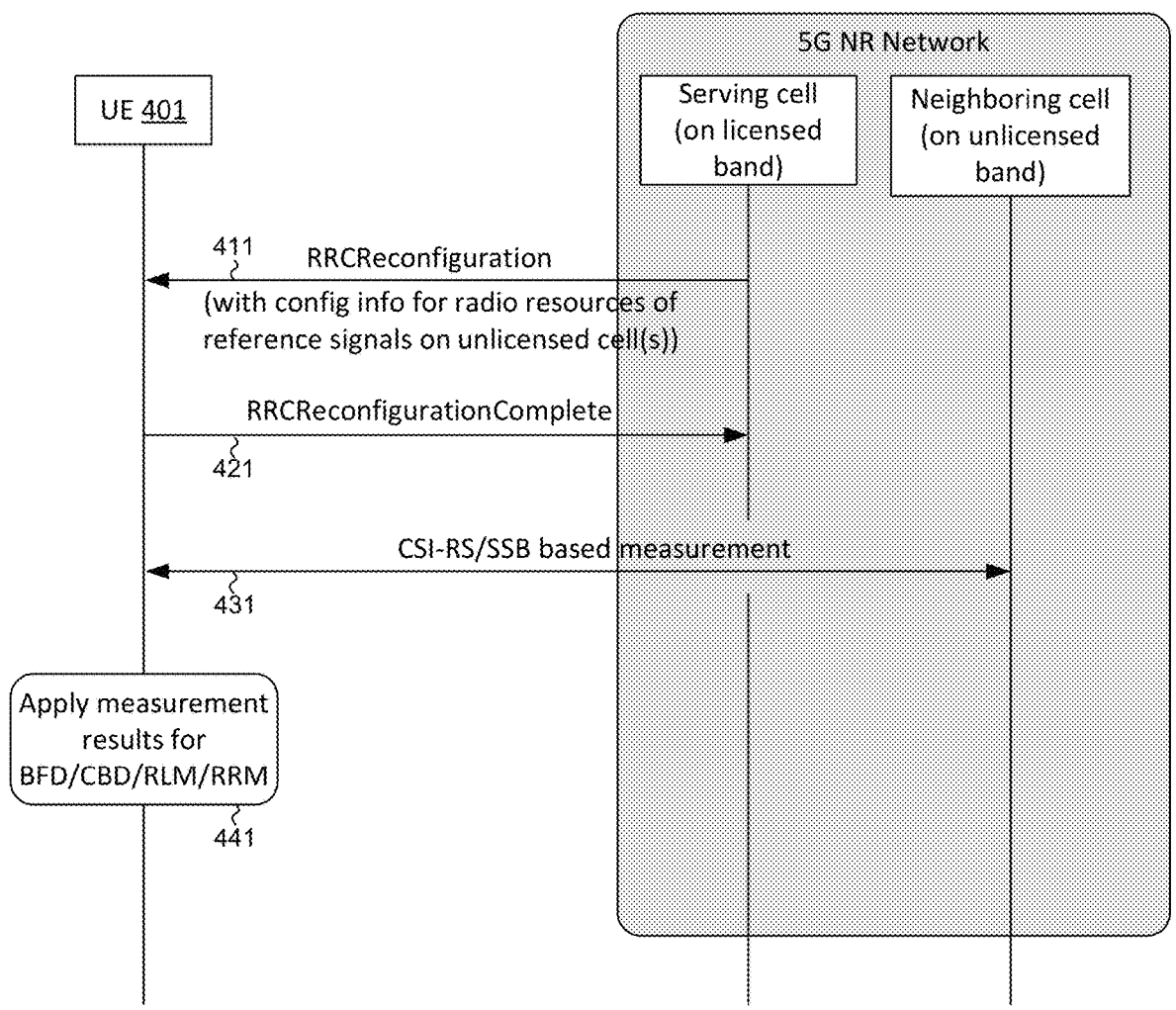
FIG. 4 illustrates a sequence flow between a UE 401 and a 5G NR network for reference signal based measurements on an unlicensed cell in accordance with one novel aspect.

FIG. 4 illustrates a sequence flow between a UE 401 and a 5G NR network for reference signal based measurements on an unlicensed cell in accordance with one novel aspect. In step 411, the UE 401 receives an RRCReconfiguration message with configuration including information regarding radio resources of CSI-RS/SSB on unlicensed cell(s). In step 421, the UE 401 sends an RRCReconfigurationComplete message to the 5G NR network. In step 431, the UE 401 performs measurements of CSI-RS/SSB on unlicensed cell (s) based on the received configuration. In step 441, the UE 401 applies the measurement results for BFD/CBD/RLM/RRM.

Figure 5:
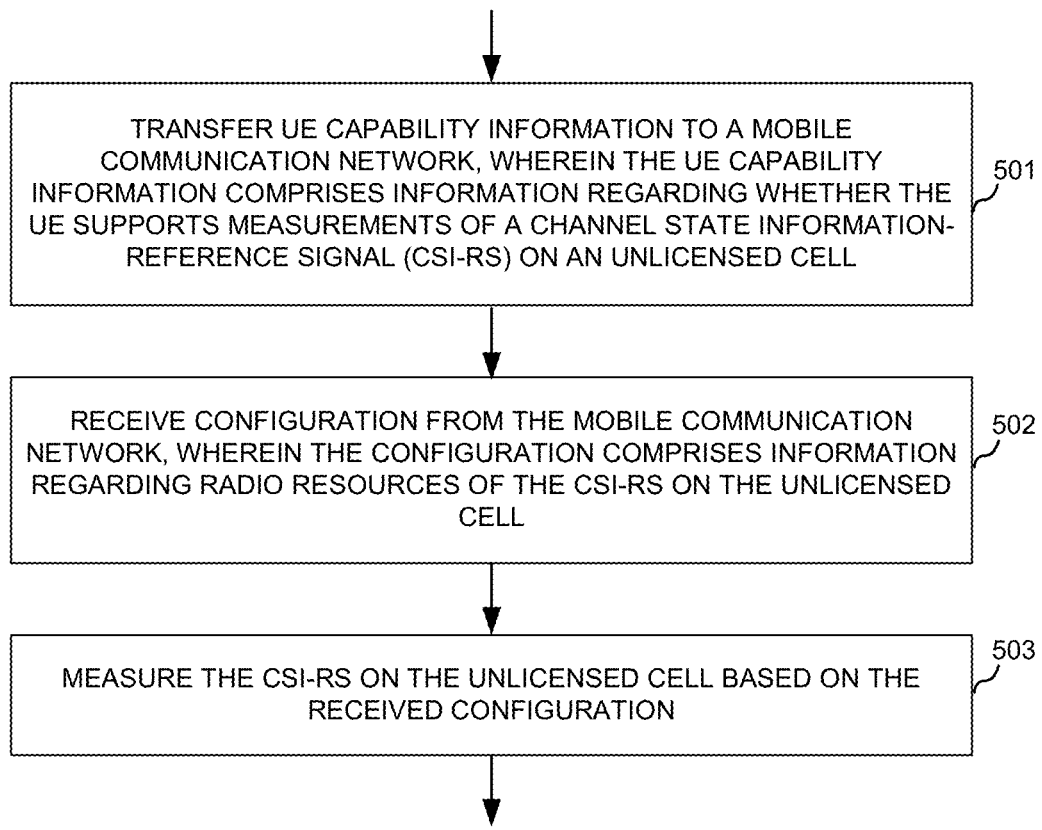
FIG. 5 is a flow chart of a method for UE capability signaling for reference signal based measurements in NR-U in accordance with one novel aspect.

FIG. 5 is a flow chart of a method for UE capability signaling for reference signal based measurements in NR-U in accordance with one novel aspect. In step 501, a UE transfers its UE capability information to a mobile communication network, wherein the UE capability information comprises information regarding whether the UE supports measurements of a CSI-RS on an unlicensed cell. In step 502, the UE receives configuration from the mobile communication network, wherein the configuration comprises information regarding radio resources of the CSI-RS on the unlicensed cell. In step 503, the UE measures the CSI-RS on the unlicensed cell based on the configuration.

In one embodiment, the UE capability information indicates whether the UE supports measurements of the CSI-RS on the unlicensed cell for BFD/CBD, and the measuring of the CSI-RS on the unlicensed cell is performed for BFD/CBD.

In another embodiment, the UE capability information indicates whether the UE supports measurements of the CSI-RS on the unlicensed cell for RLM, and the measuring of the CSI-RS on the unlicensed cell is performed for RLM.

In another embodiment, the UE capability information indicates whether the UE supports measurements of the CSI-RS on the unlicensed cell for RRM, and the measuring of the CSI-RS on the unlicensed cell is performed for RRM.

In one example, the UE capability information indicates whether the UE supports measurements of the CSI-RS on the unlicensed cell with an indication from the mobile communication network. The indication may comprise at least one of the following: an SSB; a PBCH block; PDCCH data; GC-PDCCH data; and PDSCH data.

In one example, the UE capability information indicates that the UE supports measurements of the CSI-RS on the unlicensed cell as long as the CRS-RS is transmitted within a time duration by the unlicensed cell. The time duration may be a COT in PDCCH, which is acquired by the unlicensed cell. Furthermore, the UE may cancel CSI-RS reception in a set of symbols of a slot, which are not within the indicated COT.

In one example, the UE capability information is set and reported per frequency band.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
   receiving a User Equipment (UE) capability enquiry message from a mobile communication network;
   transferring UE capability information to the mobile communication network by a UE, wherein the UE capability information comprises information regarding whether the UE supports measurements of a Channel State Information-Reference Signal (CSI-RS) on an unlicensed cell;
   receiving configuration from the mobile communication network by the UE, wherein the configuration comprises information regarding radio resources of the CSI-RS on the unlicensed cell; and
   measuring the CSI-RS on the unlicensed cell based on the configuration by the UE.

2. The method of claim 1, wherein the UE capability information indicates whether the UE supports measurements of the CSI-RS on the unlicensed cell for Beam Failure Detection (BFD) or Candidate Beam Detection (CBD), and the measuring of the CSI-RS on the unlicensed cell is performed for BFD or CBD.

3. The method of claim 1, wherein the UE capability information indicates whether the UE supports measurements of the CSI-RS on the unlicensed cell for Radio Link Monitoring (RLM), and the measuring of the CSI-RS on the unlicensed cell is performed for RLM.

4. The method of claim 1, wherein the UE capability information indicates whether the UE supports measurements of the CSI-RS on the unlicensed cell for Radio Resource Management (RRM), and the measuring of the CSI-RS on the unlicensed cell is performed for RRM.

5. The method of claim 1, wherein the UE capability information indicates whether the UE supports measurements of the CSI-RS on the unlicensed cell with an indication from the mobile communication network.

6. The method of claim 5, wherein the indication comprises at least one of the following:
   a Synchronization Signal Block (SSB);
   a Physical Downlink Control Channel (PDCCH) data;
   a Group-Common PDCCH (GC-PDCCH) data; and
   a Physical Downlink Shared Channel (PDSCH) data.

7. The method of claim 1, wherein the UE capability information indicates that the UE supports measurements of the CSI-RS on the unlicensed cell as long as the CRS-RS is transmitted within a time duration by the unlicensed cell.

8. The method of claim 7, wherein the time duration is a Channel Occupancy Time (COT) in PDCCH, which is acquired by the unlicensed cell.

9. The method of claim 8, further comprising:
   canceling CSI-RS reception in a set of symbols of a slot, which are not within the COT by the UE.

10. The method of claim 1, wherein the UE capability information is set and reported per frequency band.

11. A User Equipment (UE), comprising:
    a transmitter that transfers UE capability information to a mobile communication network, wherein the UE capability information comprises information regarding whether the UE supports measurements of a Channel State Information-Reference Signal (CSI-RS) on an unlicensed cell;
    a receiver that receives UE capability enquiry message from the mobile communication network and receives configuration from the mobile communication network, wherein the configuration comprises information regarding radio resources of the CSI-RS on the unlicensed cell; and
    a measurement handling circuit that measures the CSI-RS on the unlicensed cell based on the configuration.

12. The UE of claim 11, wherein the UE capability information indicates whether the UE supports measurements of the CSI-RS on the unlicensed cell for Beam Failure Detection (BFD) or Candidate Beam Detection (CBD), and the measuring of the CSI-RS on the unlicensed cell is performed for BFD or CBD.

13. The UE of claim 11, wherein the UE capability information indicates whether the UE supports measurements of the CSI-RS on the unlicensed cell for Radio Link Monitoring (RLM), and the measuring of the CSI-RS on the unlicensed cell is performed for RLM.

14. The UE of claim 11, wherein the UE capability information indicates whether the UE supports measurements of the CSI-RS on the unlicensed cell for Radio Resource Management (RRM), and the measuring of the CSI-RS on the unlicensed cell is performed for RRM.

15. The UE of claim 11, wherein the UE capability information indicates whether the UE supports measurements of the CSI-RS on the unlicensed cell with an indication from the mobile communication network.

16. The UE of claim 15, wherein the indication comprises one of the following:
    a Synchronization Signal Block (SSB);
    a Physical Downlink Control Channel (PDCCH) data;
    a Group-Common PDCCH (GC-PDCCH) data; and
    a Physical Downlink Shared Channel (PDSCH) data.

17. The UE of claim 11, wherein the UE capability information indicates that the UE supports measurements of the CSI-RS on the unlicensed cell as long as the CRS-RS is transmitted within a time duration by the unlicensed cell.

18. The UE of claim 17, wherein the time duration is a Channel Occupancy Time (COT) in PDCCH, which is acquired by the unlicensed cell.

19. The UE of claim 18, wherein the UE cancels CSI-RS reception in a set of symbols of a slot, which are not within the indicated COT.

20. The UE of claim 11, wherein the UE capability information is set and reported per frequency band.

* * * * *